(12) United States Patent
Yamaguchi

(10) Patent No.: US 10,252,342 B2
(45) Date of Patent: Apr. 9, 2019

(54) CUTTING INSERT

(71) Applicant: TUNGALOY CORPORATION, Iwaki-shi, Fukushima (JP)

(72) Inventor: Takashi Yamaguchi, Iwaki (JP)

(73) Assignee: TUNGALOY CORPORATION, Iwaki-shim, Fukushima (JP)

( * ) Notice: Subject to any disclaimer, the term of this patent is extended or adjusted under 35 U.S.C. 154(b) by 191 days.

(21) Appl. No.: 15/112,806

(22) PCT Filed: Feb. 6, 2015

(86) PCT No.: PCT/JP2015/053431
§ 371 (c)(1),
(2) Date: Jul. 20, 2016

(87) PCT Pub. No.: WO2015/119258
PCT Pub. Date: Aug. 13, 2015

(65) Prior Publication Data
US 2016/0339524 A1 Nov. 24, 2016

(30) Foreign Application Priority Data
Feb. 7, 2014 (JP) .................................. 2014-021831

(51) Int. Cl.
B23C 5/20 (2006.01)
B23B 27/14 (2006.01)

(52) U.S. Cl.
CPC .... *B23B 27/143* (2013.01); *B23B 2200/0447* (2013.01); *B23B 2200/081* (2013.01); *B23B 2200/087* (2013.01)

(58) Field of Classification Search
CPC .......... B23B 27/143; B23B 2200/0447; B23B 2200/081; B23B 2200/087
See application file for complete search history.

(56) References Cited

U.S. PATENT DOCUMENTS

| 4,720,217 A | 1/1988 | Bonjour et al. |
| 2005/0019111 A1 | 1/2005 | Kitagawa et al. |

(Continued)

FOREIGN PATENT DOCUMENTS

| CN | 103551613 A | 2/2014 | |
| JP | 2007-301669 | 11/2007 | |
| JP | WO 2008093592 A1 * | 8/2008 | ......... B23B 27/1618 |

OTHER PUBLICATIONS

International Search Report dated Apr. 28, 2015 issued in counterpart International (PCT) Application (No. PCT/JP2015/053431).

(Continued)

*Primary Examiner* — Alan Snyder
(74) *Attorney, Agent, or Firm* — Studebaker & Brackett PC

(57) ABSTRACT

A cutting insert (1) includes at least one cutting edge (8) formed on an intersecting ridge line portion between a rake surface (6) and a flank (7), and at least one ridge (12). The cutting edge includes a cutting edge portion (9) extending along a corner portion (5) and a straight-line shaped cutting edge portion (10) connecting to the cutting edge portion (9). The ridge (12) is formed to rise on the rake surface (6). The ridge (12) extends from a portion of a rake surface inside the cutting edge portion of the corner portion toward a rake surface inside the straight-line shaped cutting edge portion.

20 Claims, 14 Drawing Sheets

(56) References Cited

U.S. PATENT DOCUMENTS

| | | |
|---|---|---|
| 2013/0251468 A1 | 9/2013 | Lof |
| 2014/0154019 A1* | 6/2014 | Pacheri ................ B23B 27/143 407/114 |
| 2015/0078844 A1 | 3/2015 | Majima et al. |
| 2016/0082518 A1 | 3/2016 | Sakai |

OTHER PUBLICATIONS

Written Opinion dated Apr. 28, 2015 issued in counterpart International (PCT) Application (No. PCT/JP2015/053431).
Extended European Search Report dated Mar. 13, 2017 issued in counterpart European application (No. EP 15745893.6).

* cited by examiner

CUTTING INSERT

RELATED APPLICATIONS

This is a 371 US National Phase of International Patent Application No. PCT/JP2015/053431 filed Feb. 6, 2015 and published as WO 2015/119258A1 on Aug. 13, 2015, which claims priority to JP 2014-021831, filed Feb. 7, 2014. The contents of the aforementioned applications are incorporated by reference in their entirety.

TECHNICAL FIELD

The present invention relates to a cutting insert detachably mounted to a tool body of a cutting tool to be used for a cutting work of metal material or the like.

BACKGROUND ART

As a conventional cutting insert, there is a cutting insert disclosed in the Patent Literature 1. The cutting insert described in the Patent Literature 1 has a substantially rhombus, plate-like shape, and includes a chip breaker groove on at least one of opposite end surfaces. The chip breaker groove is formed at a position including a vicinity of a corner portion of each end surface. The chip breaker groove includes a rake surface. A flank on which a cutting edge extends along the intersecting ridge line portion between the rake surface and the flank extends on a side surface connecting the two end surfaces with each other. The cutting insert includes a breaker protruding portion protruding toward a corner cutting edge in a circular arc shape at the corner portion. Further, the cutting insert is also disclosed that has a breaker protruding portion protruding toward a straight-line shaped cutting edge connecting to the corner cutting edge.

CITATION LIST

Patent Literature

PTL 1: Japanese Patent Laid-Open No. 2007-301669

SUMMARY OF INVENTION

Technical Problem

The conventional cutting insert described in the Patent Literature 1 is directed to breaking chips flowing along the rake surface with the breaker protruding portion positioned farther away from the cutting edge than the rake surface, and thus leaves room for improvement in a tool life. More specifically, the cutting insert according to the Patent Literature 1 includes the smooth rake surface along the cutting edge, and thus easily generates crater wear on the rake surface. The generation of the crater wear causes chipping and defect of the cutting edge to further cause deterioration of the tool life.

The present invention has an object to provide the cutting insert being capable of inhibiting the generation of the crater wear without deteriorating chip control performance.

Solution to Problem

According to an aspect of the present invention, there is provided a cutting insert including: at least one cutting edge formed on an intersecting ridge line portion between a rake surface and a flank, each cutting edge including a cutting edge portion extending along a corner portion and a straight-line shaped cutting edge portion connecting to the cutting edge portion of the corner portion; and at least one ridge formed to rise on the rake surface, wherein the ridge extends from a portion of a rake surface inside the cutting edge portion of the corner portion toward a rake surface inside the straight-line shaped cutting edge portion.

According to the cutting insert of the above-described aspect having such a configuration, the ridge formed to rise on the rake surface extends from the portion of the rake surface inside the cutting edge portion of the corner portion toward the rake surface inside the straight-line shaped cutting edge portion. With the ridge, a chip generated in a cutting work can be forcibly, efficiently separated away from the rake surface. Therefore, generation of crater wear on the rake surface can be greatly reduced. Further, the ridge is formed in relation to the rake surface, and does not lose freedom of forming a breaker wall surface. Thus, according to the cutting insert of the above-described aspect of the present invention, the generation of the crater wear can be reduced without deteriorating chip control performance, thereby greatly extending the life duration of the tool.

Preferably, the ridge may be formed to be away from the cutting edge as becoming closer to the inside of the straight-line shaped cutting edge portion from the inside of the cutting edge portion of the corner portion. More preferably, the ridge extends in a curved shape to be convex toward a side of the cutting edge. Further preferably, the ridge includes a portion in which an amount of rising from the rake surface is gradually increased as increasing a distance from the cutting edge portion of the corner portion.

The above-described cutting insert may include two opposite end surfaces, a first end surface of the two end surfaces having a substantially a polygonal shape, when the cutting insert is viewed from a side facing the first end surface, and a circumferential side surface formed between the two opposite end surfaces in such a manner to connect with each other, wherein the cutting edge can be formed on the intersecting ridge line portion between the rake surface of the first end surface and the flank of the circumferential side surface. Preferably, when the cutting insert is viewed from the side facing the first end surface, a plurality of ridges are formed in a mirror-symmetrical relationship with respect to a plane which is defined so as to bisect the corner portion of the cutting insert. Or, when the cutting insert is viewed from the side facing the first end surface, the ridge may be formed to cross the plane defined to bisect the corner portion of the cutting insert, and may have a mirror-symmetrical shape with respect to the plane. When the cutting insert is viewed from the side facing the circumferential side surface, all the ridge may be hidden, or the ridge may include a portion protruding outside from the cutting edge and a portion not protruding outside from the cutting edge.

On the first end surface, a chip breaker groove may be formed that is at least partially formed of the rake surface and a rising wall surface. In addition to the chip breaker groove described above, or regardless of it, at least one rising portion may be further formed on the first end surface to rise on the rake surface. The rising portion may include a width-expansion portion gradually expanding as becoming closer to the cutting edge portion of the corner portion. The rising portion may extend, when the cutting insert is viewed from the side facing to the first end surface, along a plane defined to bisect the corner portion of the cutting insert, to be away from the cutting edge portion of the corner portion. In this case, the width-expansion portion may be positioned at a portion closest to the cutting edge of the rising portion. Further, when two ridges described above are disposed for each corner portion, the two ridge portions may extend in such a manner to sandwich the rising portion.

A plurality of cutting edges can be formed on an intersecting ridge line portion between the first end surface and the circumferential side surface. In this case, the first end surface may be configured to have n-fold rotational symmetry about a first axis ("n" is a natural number of 2 or more). In addition, when a plurality of cutting edges is formed on the intersecting ridge line portion between the second end surface of the two end surfaces and the circumferential side surface, the second end surface may be configured to have 180-degree rotational symmetry with respect to the first end surface about the second axis defined to be orthogonal to the first axis.

DESCRIPTION OF EMBODIMENTS

With reference to figures, embodiments of the present invention will be described below.

First, a cutting insert 1 according to a first embodiment of the present invention will be described.

Figure 1:
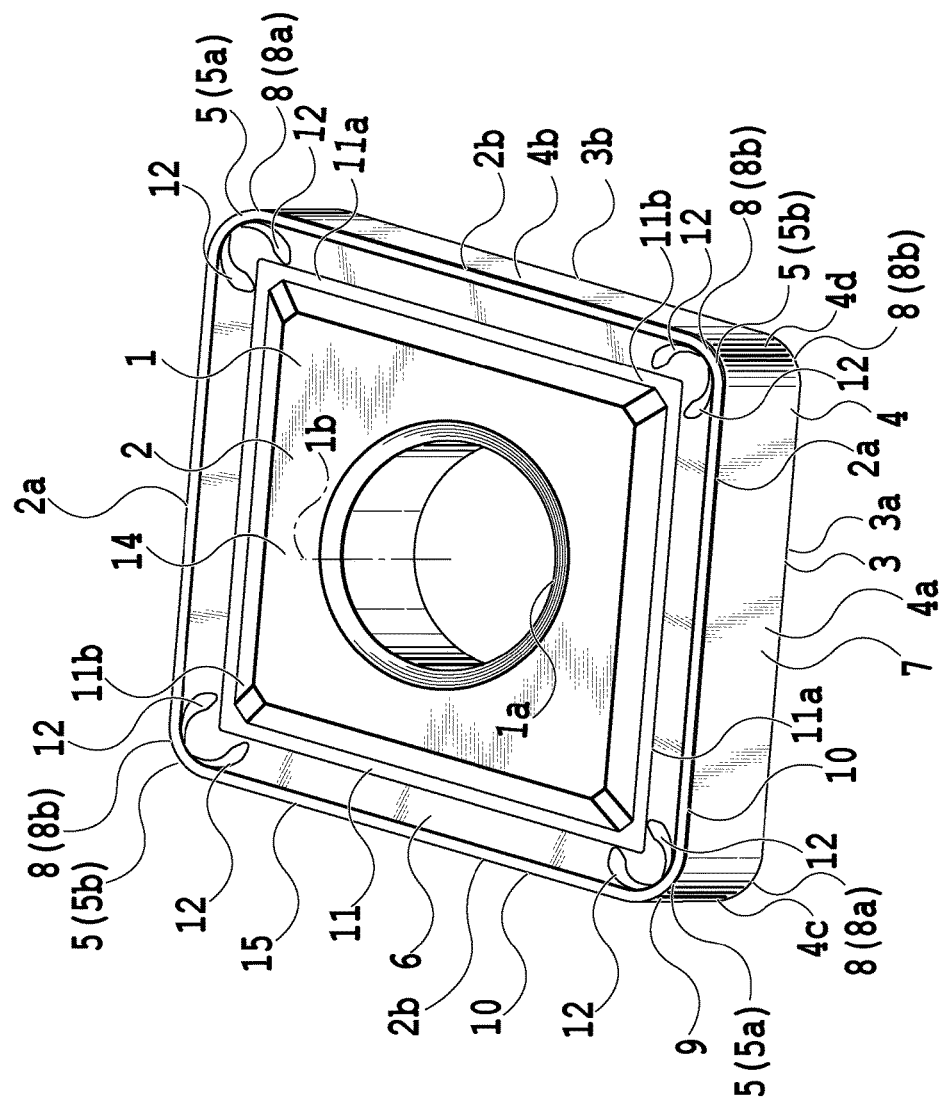
FIG. 1 is a perspective view of a cutting insert according to a first embodiment of the present invention.
Figure 3:
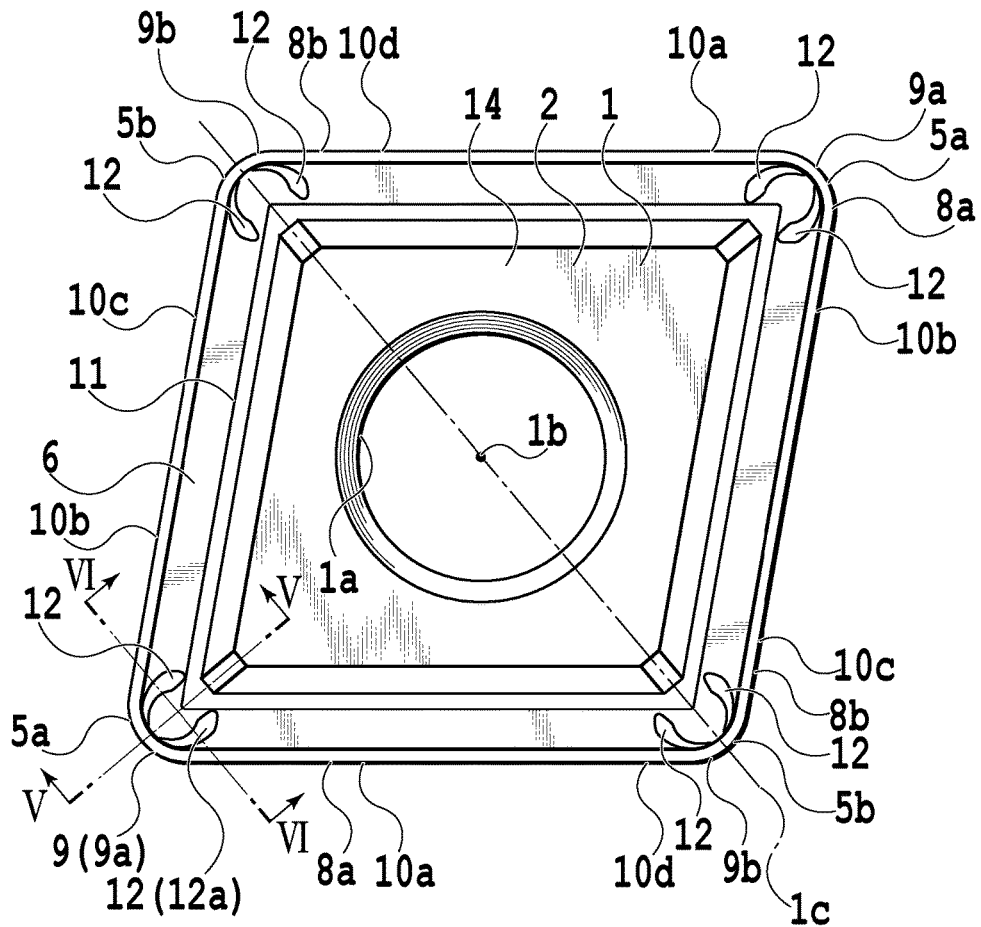
FIG. 3 is a plan view of the cutting insert illustrated in FIG. 1.
Figure 4:
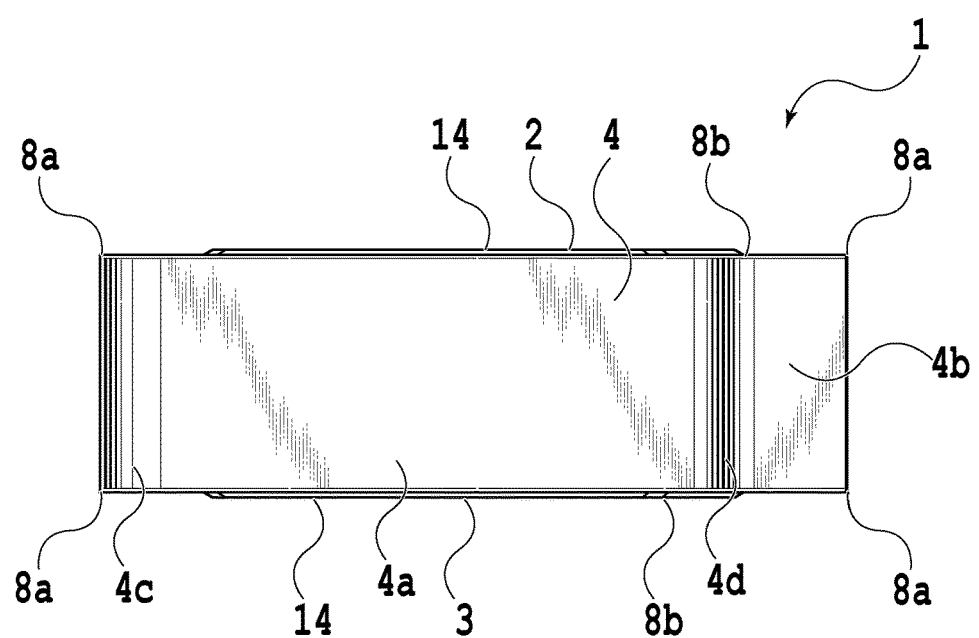
FIG. 4 is a side view of the cutting insert illustrated in FIG. 1.

As described in FIGS. 1 and 3, a cutting insert 1 according to the embodiment has a substantially rhombus-plate-like shape. The cutting insert 1 includes two opposite end surfaces 2, 3 with substantially rhombus shape, and a circumferential side surface 4 connecting the two end surfaces 2, 3 with each other. Each end surface in the substantially rhombus shape includes four corners or corner portions 5. More specifically, each end surface includes two corner portions (first corner portions) 5a having an inner angle of 80 degrees in a plan view illustrated in FIG. 3, and two corner portions (second corner portions) 5b having an inner angle of 100 degrees in a plan view illustrated in FIG. 3. Herein, an end surface (first end surface) 2 illustrated in FIG. 1 is referred to as an upper surface, and the other end surface (second end surface) of the two end surfaces 2, 3 is referred to as a lower surface 3. For simpler description, terms representing an orientation in space, for example the "upper surface", are used for the sake of convenience, but does not intend to specify an absolute orientation or a positional relationship in the space. Unless otherwise specifically described, other terms representing the orientation and the positional relationship in the space are used in a similar manner.

As described above, an upper surface 2 has the substantially rhombus shape when the cutting insert 1 is viewed from a side (or a direction) facing the upper surface 2, in other words, in a plan view illustrated in FIG. 3. Therefore, the upper surface 2 includes two pairs of opposite side portions. More specifically, the upper surface 2 includes a pair of opposite first upper side portions 2a, 2a, and a pair of opposite second upper side portions 2b, 2b. In a similar manner, a lower surface 3 also has the substantially rhombus shape, and includes a pair of opposite first lower side portions 3a, 3a, and a pair of opposite second lower side portions 3b, 3b. A first side surface 4a extends between the first upper side portion 2a and the first lower side portion 3a, and a second side surface 4b extends between the second upper side portion 2b and the second lower side portion 3b. To connect the first and second side surfaces 4a, 4b with each other, a first corner side surface 4c is formed to connect the first corner portion 5a on the upper surface 2 with the first corner portion 5a on the lower surface 3 and, further, a second corner side surface 4d is formed to connect the second corner portion 5b on the upper surface 2 with the second corner portion 5b on the lower surface 3.

Each of end surfaces 2, 3 of the cutting insert 1 is formed to have 180-degree rotational symmetry. A cutting insert 1 includes a mounting hole 1a extending to pass through the upper surface 2 and the lower surface 3. The cutting insert 1 is formed to have 180-degree rotational symmetry (i.e., two-fold rotational symmetry) about a central axis (first axis) 1b of the mounting hole 1a.

The cutting insert 1 according to the embodiment can be used by turning over the cutting insert 1 between the upper surface 2 and the lower surface 3, which is a so-called, negative type cutting insert 1. In addition, the cutting insert 1 is formed in such a manner, when an axis (second axis) 1c that is orthogonal to the central axis 1b of the mounting hole 1a and passes through the circumferential side surface 4 is defined as illustrated in FIG. 3, to have 180-degree rotational symmetry about the second axis 1c. Therefore, the first and second upper side portions 2a, 2b have the same shape and configuration as those of the second and first lower side portions 3b, 3a. Since the lower surface 3 has the same shape and the same configuration as those of the upper surface 2, a plan view (not illustrated) of the cutting insert 1 when the cutting insert 1 is viewed from the side facing the lower surface 3 corresponds to that illustrated in FIG. 3. In other words, the lower surface side has the same configuration of a cutting edge as that of the upper surface side. A cutting edge 8 is formed on the intersecting ridge line portion between the upper surface 2 and the circumferential side surface 4 and, also, formed on the intersecting ridge line portion between the lower surface 3 and the circumferential side surface 4. Each cutting edge 8 is formed on an intersection portion (intersecting ridge line portion) between a rake surface 6 and a flank 7. The rake surface 6 extends on a corresponding end surface on which a relating or corresponding cutting edge 8 is formed at the edge portion. The flank 7 extends on the circumferential side surface 4. On each of the upper and lower surfaces 2, 3, a chip breaker groove 11 corresponding to each cutting edge 8 is formed. The chip breaker groove 11 on the upper surface 2 has the same shape and the same configuration as those of the chip breaker groove 11 on the lower surface 3. As described above, since the lower surface 3 has the same configuration as that of the upper surface 2, the configuration of the side of the upper surface 2 will be described below, and an explanation about the configuration of the side of the lower surface 3 will be omitted. However, it should be noted that the description about the configuration of the side of the upper surface 2 side can be similarly adopted to the side of the lower surface 3. The present invention permits a cutting insert including the cutting edge only on one surface, and various types of cutting inserts including only one or a plurality of cutting edges.

The chip breaker groove 11 is formed for each cutting edge 8. Herein, an inclined surface substantially lowering from the cutting edge 8 to the chip breaker groove 11 is referred to as the rake surface 6. Exceptionally, there may be a case where the rake surface 6 includes a rake angle of 0 degrees (in a case where the rake surface extends along a virtual plane defined to be orthogonal to the central axis 1b). In other words, the rake surface may not lower from the cutting edge 8. Further, there may be a case where honing processing is performed on the cutting edge 8 so that the rake surface 6 includes a surface portion that locally, reversely inclines (in such a manner to contribute forming a negative rake angle). The rake surface 6 may, as a result of disposition of a land 15 or the like, include a surface portion that locally, reversely inclines.

A portion of the circumferential side surface 4 connecting to the cutting edge 8 is defined as the flank 7. The flank 7 is defined to intersect each of the upper surface 2 and the lower surface 3 at a right angle. The cutting insert 1 is defined as the cutting insert having the clearance angle of 0 degrees. More correctly, when a virtual plane being orthogonal to the central axis 1b of the mounting hole 1a is defined, the circumferential side surface 4, in other words, the flank 7 extends at the right angle with respect to the virtual plane.

The upper surface 2 is formed with two first cutting edges 8a disposed at the first corner portions 5a having the inner angle of 80 degrees in the plan view (i.e., FIG. 3), and two second cutting edges 8b disposed at the second corner portions 5b including the inner angle of 100 degrees in the plan view. Since the first cutting edge 8a and the second cutting edge 8b have different inner angles of the corner portions, they have different shapes from each other, but have similar configurations.

Each of the cutting edges 8 (8a, 8b) is configured as one cutting edge section, and includes at least two cutting edge portions connecting with each other, in other words, the cutting edge portion of the corner portion, and the cutting edge portion connecting to the cutting edge portion of the corner portion. Particularly, each cutting edge 8 includes a corner cutting edge (cutting edge portion) 9 in a circular-arc shape that is the cutting edge along the corner portion, and at least one straight-line shaped cutting edge (cutting edge portion) 10 connecting to the corner cutting edge 9. More specifically, the first cutting edge 8a includes a corner cutting edge 9a in a circular-arc shape disposed at the first corner portion 5 and a pair of straight-line shaped cutting edges 10a, 10b each extending from the corner cutting edge 9a. A second cutting edge 8b includes a corner cutting edge 9b in a circular-arc shape disposed at the second corner portion 5b, and a pair of straight-line shaped cutting edges 10c, 10d each extending from the corner cutting edge 9b. The corner cutting edges 9a, 9b have a shape formed along curved shapes of the corresponding corner portions 5a, 5b respectively. Regarding the first cutting edge 8a, the straight-line shaped cutting edge 10a connects to one end of the corner cutting edge 9a, and extends along the first side portion 2a of the upper surface 2 toward the side of the second corner portion 5b, and the straight-line shaped cutting edge 10b connects to the other end of the corner cutting edge 9a, and extends along the second side portion 2b of the upper surface 2 toward the side of the second corner portion 5b. Further, regarding the second cutting edge 8b, a straight-line shaped cutting edge 10c connects to one end of the corner cutting edge 9b, and extends along the second side portion 2b of the upper surface 2 toward the side of the first corner portion 5a, and the straight-line shaped cutting edge 10d connects to the other end of the corner cutting edge 9b, and extends along the first side portion 2a of the upper surface 2 toward the side of the first corner portion 5a. However, since in the cutting insert 1, the upper surface 2 has a substantially rhombus shape as described above, the straight-line shaped cutting edges 10a, 10b are formed to have a left-right symmetry with respect to a bisector (corresponding to a line V-V) of the first corner portion 5a illustrated in FIG. 3. The straight-line shaped cutting edges 10c, 10d are also formed to have a left-right symmetry with respect to a bisector of the second corner portion 5b illustrated in FIG. 3. In the cutting insert 1, the first cutting edge 8a is continuous with each of the second cutting edges 8b positioned at both sides. Therefore, the cutting insert 1 includes cutting edges 8 all over an entire circumference of the upper surface 2. However, the first cutting edge 8a does not have to be continuously provided with the second cutting edge 8b.

Material of the cutting edge 8 of the cutting insert 1 is selected from among hard materials such as cemented carbide, cermet, ceramic, and cubic boron nitride, or among hard materials with the surface coated by PVD or CVD coating film. Further, it is preferable that the similar hard material and the like be also used as material of a part other than the cutting edge 8.

The chip breaker groove 11 (11a) is formed for the first cutting edge 8a, and the chip breaker groove 11 (11b) is formed for the second cutting edge 8b. The chip breaker groove 11 needs to be formed near the first corner portion 5a at least, however, since the cutting edge 8b is also provided at the second corner portion 5b of the cutting insert 1 according to the present embodiment, the chip breaker groove 11 is also formed near the second corner portion 5b. In the cutting insert 1, the chip breaker groove 11a is formed along the first cutting edge 8a, and the chip breaker groove 11b is formed along the second cutting edge 8b. As described above, the first cutting edge 8a and the second cutting edge 8b are continuously provided with each other, and then, the first and second chip breaker grooves 11a, 11b may be continuously provided with each other, however, they do not have to be continuously provided with each other. The chip breaker groove 11a includes, in order from the side of the first cutting edge 8a, the rake surface 6, a bottom portion 11s, a rising wall surface (or breaker wall surface) 11r. In a similar manner, the chip breaker groove 11b includes, in order from the side of the second cutting edge 8b, the rake surface 6, the bottom portion 11s, the rising wall surface (or breaker wall surface) 11r.

Figure 2:
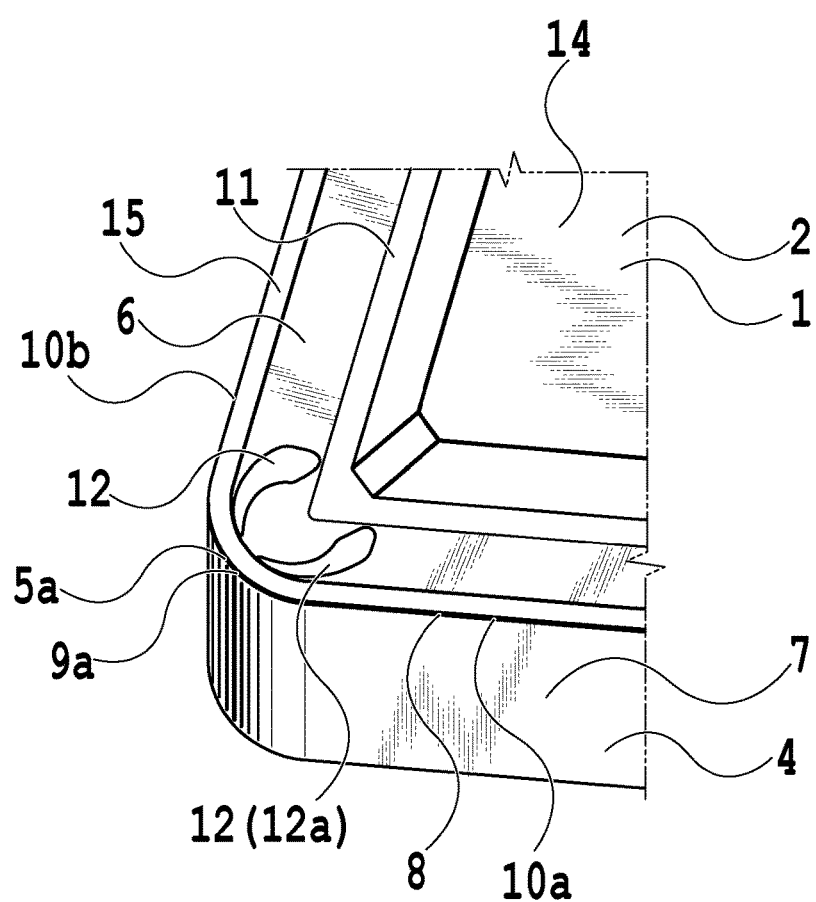
FIG. 2 is an enlarged, perspective view of a vicinity of one corner portion of the cutting insert illustrated in FIG. 1.

The cutting insert 1 according to the embodiment includes each two ridges 12 near each corner portion 5. The chip breaker groove 11a includes two ridges 12 near the first corner portion 5a. In a similar manner, the chip breaker groove 11b also includes two ridges 12 near the second corner portion 5b. The ridge 12 near the second corner portion 5b has difference from that near the first corner portion 5a, the difference corresponding to the difference in a shape between the first and second corner portions 5a, 5b. However, in other points, the ridge 12 near the second corner portion 5b has the similar configuration to that of the ridge 12 near the first corner portion 5a. Thus, mainly, the ridge 12 near the first corner portion 5a will be described below, and an explanation about the ridge 12 near the second corner portion 5b will be omitted. Further, as described later, the two ridges 12 near the first corner portion 5a are configured to have a relationship of left-right symmetry to each other and, of the two ridges 12, the ridge 12 (ridge 12a illustrated in FIG. 2) at the side of a straight-line shaped cutting edge 10a is mainly described.

The ridge 12a is formed to rise on the rake surface 6. The ridge 12a includes a beginning end on a portion of the rake surface 6 inwardly extending from the corner cutting edge 9a. The ridge 12 is formed to, when becoming closer to a central portion (i.e., the mounting hole 1a) side of the upper surface 2 along the rake surface 6 from the corner cutting edge 9a of the first corner portion 5a, pass the rake surface 6 and then transition to a top surface (portion functioning as the rake surface) of the ridge 12 from a middle of the rake surface 6 smoothly. The ridge 12 is formed to relatively reduce an inclined angle of the rake surface 6 with respect to the virtual plane orthogonal to the central axis 1b on the way.

In addition, the ridge 12a extends in a direction (to the side of the straight-line shaped cutting edge 10a) in which the ridge 12a is away from the corner cutting edge 9 in a circular-arc shape. The ridge 12a reaches the portion of the rake surface 6 inside the straight-line shaped cutting edge 10. Therefore, the ridge 12a generally extends from the portion of the rake surface 6 inside the corner cutting edge 9a toward the portion thereof inside the straight-line shaped cutting edge 10a. Further, the ridge 12a is formed to be away from the cutting edge 8 as becoming closer to the inside of the straight-line shaped cutting edge 10a from the inside of the corner cutting edge 9a of the first corner portion 5. However, the ridge 12a may not be limited to have features totally as described above, but may have at least a part of the features.

The ridge 12a rises from the first rake surface 6. An amount of rising of the ridge 12a from the rake surface 6 is comparatively small at the beginning end side near the corner cutting edge 9. The ridge 12a includes a portion where the amount of the rising of the ridge 12a from the rake surface gradually increases as a distance from the corner cutting edge 9a increases.

Figure 5:
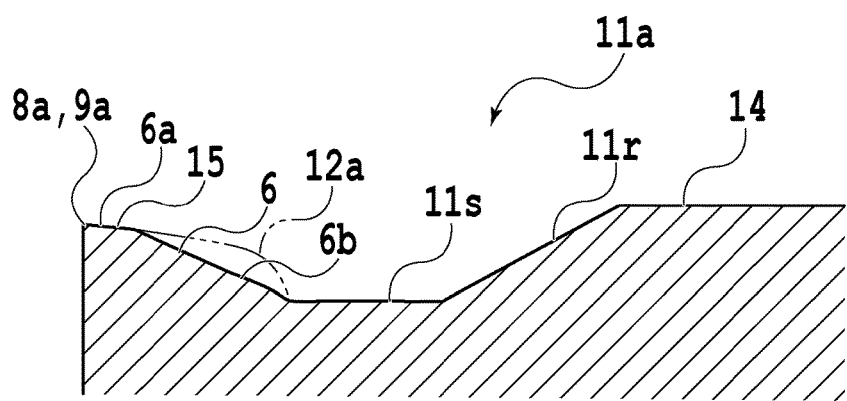
FIG. 5 is a schematic, cross-sectional view of a part of the cutting insert illustrated in FIG. 1 taken along a cross-sectional line V-V illustrated in FIG. 3.

Herein, FIG. 5 is referred to. FIG. 5 schematically illustrates a cross section of a part of the cutting insert 1 along a bisector (i.e., line V-V) of the first corner portion 5a illustrated in FIG. 3 with a length, an inclined angle, and a ratio of each portion changed. In FIG. 5, the amount of the rising of the ridge 12a from the rake surface is conceptually illustrated with a broken line, and more specifically, a state is illustrated where an outline of the ridge 12a viewed from the side of the straight-line shaped cutting edge 10a is projected on a V-V cross section. It is clear that, with reference to FIG. 5, at a portion of the cutting edge side of the ridge 12a, the amount of rising of the ridge 12a from the rake surface 6 gradually increases as a distance from the corner cutting edge 9a increases.

Further, the ridge 12a extends in a curved shape to be convex toward the side of the cutting edge 8a. In other words, the ridge 12a is closer to the cutting edge 8 at the side of the corner cutting edge 9. Corresponding to the descriptions described above, the ridge 12a curves to be away from cutting edge 8 as a distance from the corner cutting edge 9 increases.

When the ridge 12a is formed in such a shape, a chip abrading the rake surface 6 when cutting processing is performed with the first cutting edge 8a (particularly, the corner cutting edge 9a and the straight-line shaped cutting edge 10a) is lifted by the ridge 12a to be forcibly separated away from the rake surface 6. In other words, a contact region between a chip and rake surface 6 is limited to a small area. Therefore, heat of the chip is hardly transmitted to the side of rake surface 6, and generation (and development) of the crater wear on the rake surface 6 can be reduced, thereby extending the life duration of the tool. Further, since the ridge 12a extends in a direction of being away from the corner portion 5, the chip is forcibly separated away from the ridge 12a also. Therefore, the abrasion of the ridge 12 can be reduced. Furthermore, since a distance between the straight-line shaped cutting edge 10 and a portion of the ridge 12 is longer than a distance between the corner cutting edge 9 and a portion of the ridge 12 in the vicinity of the corner cutting edge 9, even when a depth of cut in a cutting condition is increased, effects of reducing the crater wear can be optimally obtained. Generally, when the crater wear develops, the substantial rake angle becomes larger, whereby the periphery of the cutting edge chips easily. Or, when the crater wear develops, a shape of chip is changed to deteriorate chip control performance. Particularly, when cutting conditions are set to high, among those, when a high feed rate is set, the life duration of the tool can be easily reduced by the development of the crater wear. Therefore, by disposing the ridge as described above, generating, in other words, forming the crater wear can be reduced, thereby largely extending the life duration of the tool.

Figure 6:
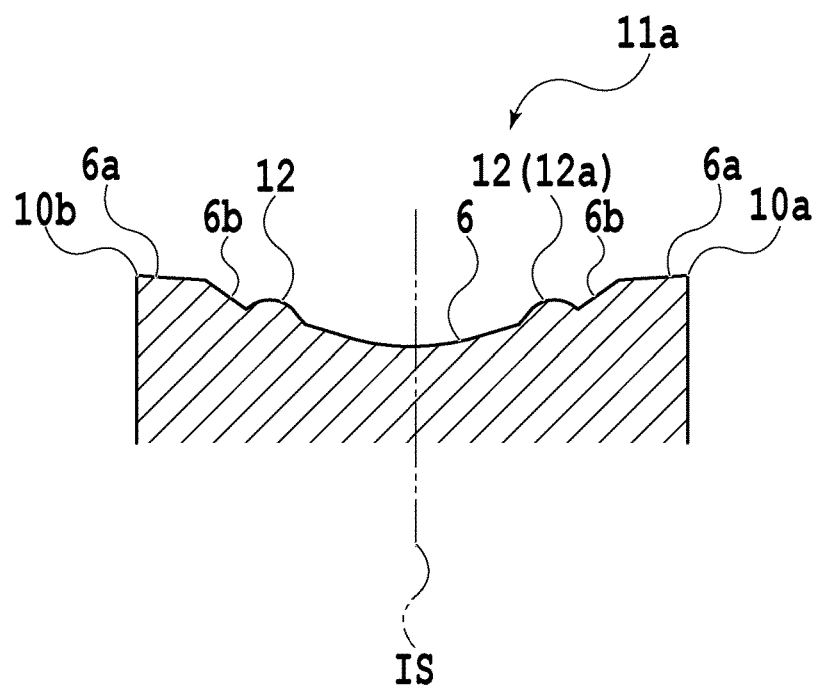
FIG. 6 is a schematic, cross-sectional view of a part of the cutting insert illustrated in FIG. 1 taken along a cross-sectional line VI-VI illustrated in FIG. 3.
Figure 7:
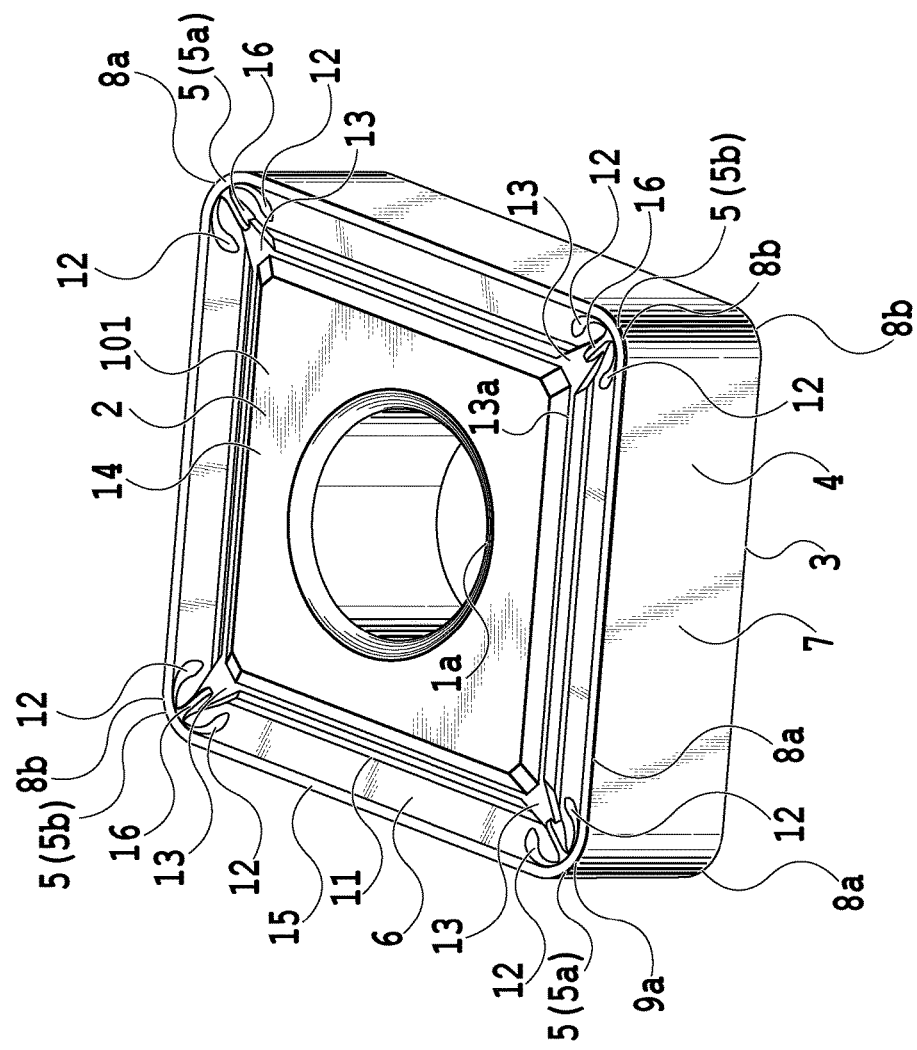
FIG. 7 is a perspective view of a cutting insert according to a second embodiment of the present invention.

Two ridges 12 disposed at the first corner portion 5a is formed in the mirror-symmetrical relationship. Herein, if the plane IS bisecting the cutting insert 1 at the corner portion 5 in a plan view illustrated in FIG. 3 is defined, the virtual plane IS overlaps the cross-sectional line V-V illustrated in FIG. 3. With respect to the virtual plane IS, the two ridges 12 (including ridge 12a) disposed at the first corner portion 5a are formed in the mirror-symmetrical relationship (refer to FIGS. 3, 6). If the ridges 12 are arranged at such positions, the cutting insert 1 having no difference in cutting performance between right handed usage of the cutting insert 1 and left handed usage thereof, that is, having no specific hand can be obtained. The cutting insert 1 according to the embodiment is formed with two ridges 12 at each corner portion 5. However, the present invention is not limited to this configuration described above. When only one ridge 12 is formed at one corner portion, the ridge 12 may continue in the mirror-symmetrical shape in which the ridge 12 intersects the plane bisecting the cutting insert 1 at the corner portion 5. Three or more ridges 12 may be formed at one corner portion, and may be formed in a mirror-symmetrical arrangement. The cutting insert 1 may be configured right handed or left handed. In other words, the cutting insert 1 may not be limited to the mirror-symmetrical shape. At least one ridge 12 may be arranged on the rake surface 6 to reach the portion of the rake surface 6 inside one straight-line shaped cutting edge 10 from a vicinity of the corner cutting edge 9.

The rake surface 6 of the cutting insert 1 according to the embodiment has a double-step structure. In other words, the rake surface 6 includes a first rake surface 6a and a second rake surface 6b. One closer to the cutting edge 8 is referred to as the first rake surface 6a. The first rake surface 6a is also referred to as a land 15. In the cutting insert 1, the ridge 12 is formed to rise on the second rake surface 6b, and extends from a boundary portion between the first rake surface 6a and the second rake surface 6b up to a boundary portion between the rake surface 6 and the bottom portion 11s. However, the present invention does not exclude a case where the ridge 12 extends up to the first rake surface 6a over the boundary portion between the first rake surface 6a and the second rake surface 6b. As described above, the inclined angle of the land may be 0 degrees. Further, exceptionally, the inclined angle of the land may be a negative angle. When the inclined angle of the land is set to the negative angle, it is preferable that the ridge 12 rises from the second rake surface but not rises on the first rake surface.

In the cutting insert 1, a boss surface 14 is formed at a higher position than the cutting edge 8 in a direction of the axis 1b of the mounting hole 1a. The boss surface 14 functions as a seat surface or an abutment surface abutting on a wall surface of an insert attachment seat when the cutting insert 1 is attached to the insert attachment seat of a tool body (not illustrated). In the cutting insert 1, the boss surface 14 extends around the mounting hole 1a along the plane defined to be orthogonal to the axis 1b of the mounting hole 1a. The boss surface 14 may be formed at a lower position than the cutting edge. Further, the boss surface 14 does not have to be limited to extend along the plane defined to be orthogonal to the axis 1b of the mounting hole 1a, but may have various types of shapes and configurations.

Subsequently, the cutting insert 101 according to a second embodiment of the present invention will be described with reference to FIG. 7 to FIG. 10. For more simple description, in descriptions below, the same member number will be given to the same components as those in the cutting insert 1 in the first embodiment, and the descriptions of them will be omitted. Further, main differences between a cutting insert 101 according to the second embodiment of the present invention and the cutting insert 1 will be described below.

In a similar manner to the description of the first embodiment described above, an explanation with respect to the first cutting edge 8a related to the first corner portion 5a on the upper surface 2 will be made below. However, the description described below can be adopted to the second cutting edge 8b on the upper surface 2 and also each cutting edge on the lower surface 3.

Figure 8A:
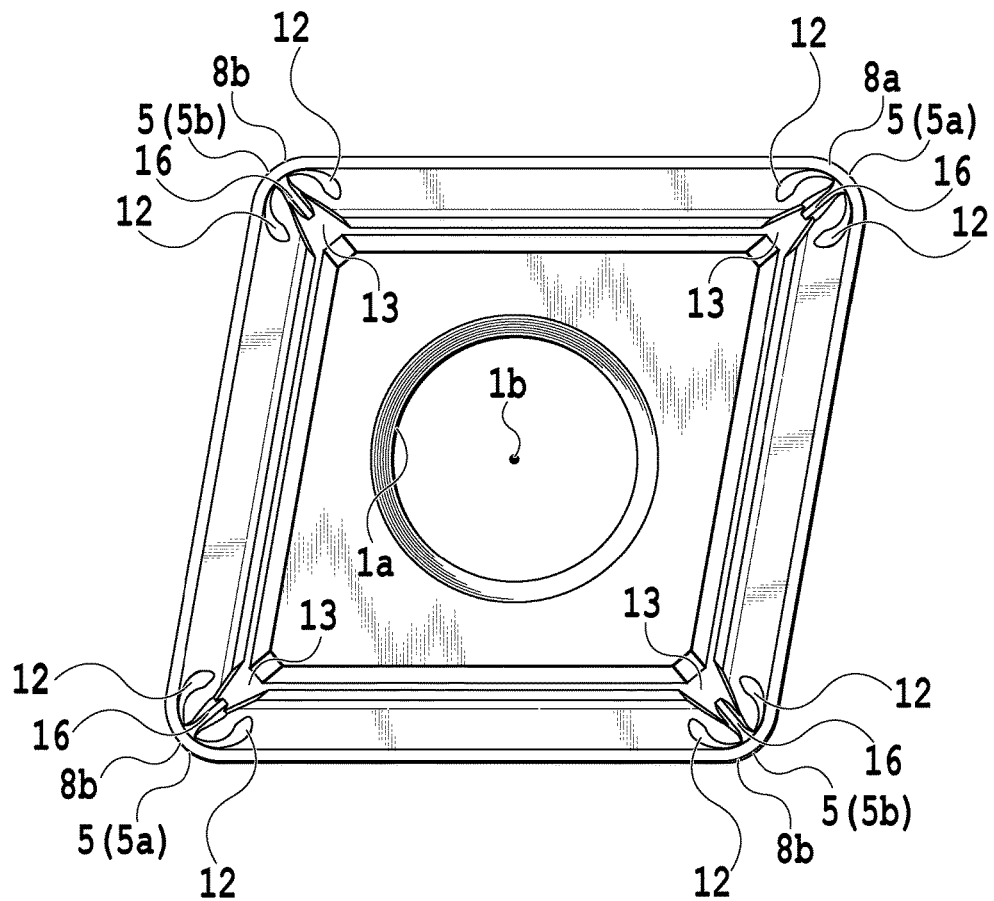
FIG. 8A is a plan view of the cutting insert illustrated in FIG. 7.
Figure 8B:
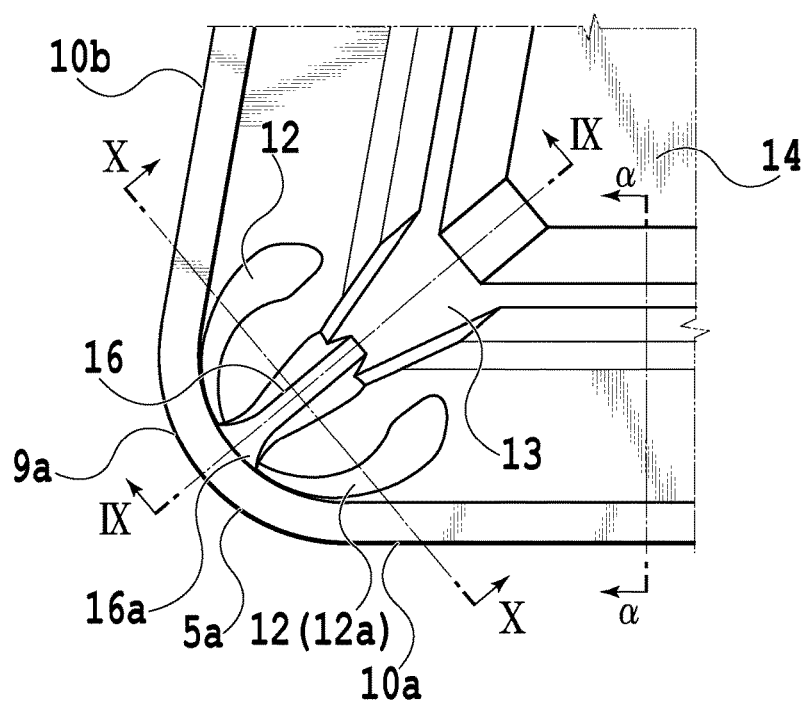
FIG. 8B is a plan view of a portion of a vicinity of one corner portion of the cutting insert illustrated in FIG. 7.

The cutting insert 101 according to the embodiment includes, in addition to the above-described ridge 12, a hill portion or the rising portion 16 in the chip breaker groove 11. The rising portion 16 is connected to the rake surface 6 to form a portion which rises on the rake surface 6 extending from the corner portion 5 (5a). In other words, the rising portion 16 is formed to rise from the rake surface 6 of the corner portion 5. The rising portion 16 is formed inside the corner portion 5 and extends in a direction of intersecting the corner portion 5. The rising portion 16 is formed to, when becoming closer to the central portion (i.e., mounting hole 1a) side of the upper surface 2 along the rake surface 6 from the corner cutting edge 9a of the first corner portion 5a, pass the rake surface 6 and then transition to the top surface (portion functioning as the rake surface) of the rising portion 16 from a middle of the rake surface 6 smoothly. The rising portion 16 is formed to relatively reduce the inclined angle of the rake surface 6 with respect to the virtual plane orthogonal to the central axis 1b on the way. Further, the rising portion 16 extends in a direction orthogonal to the corner portion 5 (first corner portion 5a) in a plan view illustrated in FIGS. 8A, 8B. More specifically, the rising portion 16 extends along the bisector of the first corner portion 5a. The bisector corresponds to the above-described virtual plane IS (the plane bisecting the corner portion in a plan view) (refer to FIG. 10), and corresponds to a cross-sectional line IX-IX illustrated in FIG. 8B. The rising portion 16 extends up to a vicinity of the bottom portion 11s between the rake surface 6 and the rising wall surface 11r. However, the present invention does not exclude a case where the rising portion 16 extends up to intersecting the bottom portion 11s between the rake surface 6 and the rising wall surface 11r. Further, as illustrated in FIGS. 8A and 8B, the ridge 12 extends up to a position away from the cutting edge by a substantially same distance as the rising portion 16. However, the ridge 12 may extend farther from the cutting edge than the rising portion 16, or the rising portion 16 may extend farther away from the cutting edge than the ridge 12.

Figure 10:
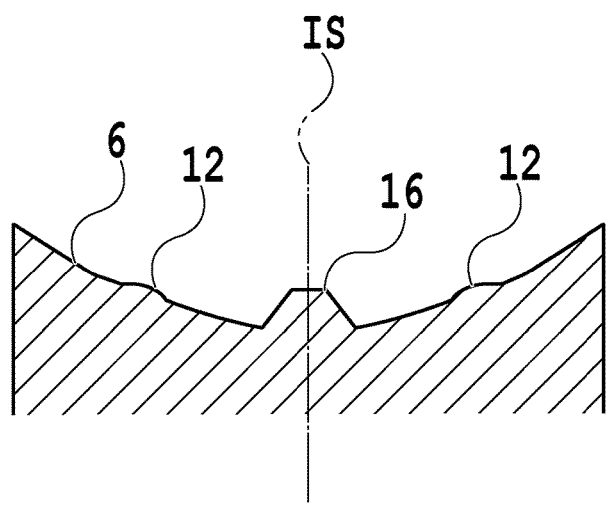
FIG. 10 is a schematic, cross-sectional view of a part of the cutting insert illustrated in FIG. 7 taken along a cross-sectional line X-X illustrated in FIG. 8B.

The rising portion 16 includes a portion, of which width is gradually increased as becoming closer to the corner cutting edge 9 of the related corner portion 5 nearby. In other words, the rising portion 16 includes a width-expansion portion 16a. Particularly, the width-expansion portion 16a of the rising portion 16 is arranged closest to the cutting edge side of the rising portion 16. In the case where the rising portion 16 is formed in such a shape, in a similar manner to the above-described ridge 12, when cutting processing is performed, a chip abrading the rake surface 6 is lifted by the rising portion 16 to be forcibly separated away from the rake surface 6. Therefore, the crater wear generated on the rake surface 6 can be greatly reduced, thereby extending the life duration of the tool. Further, since the width of the rising portion 16 is gradually reduced on the way as a distance from the rake surface 6 increases as illustrated in FIG. 10, the chip is forcibly separated away from the rising portion 16 also. Therefore, abrasion of the rising portion 16 itself can be reduced. The rising portion 16 may include a width expansion portion for a total width. Therefore, for example, the width-expansion portion 16a of the rising portion 16 may be configured in a Y-shaped letter in which a tip end side (cutting edge side) of the width-expansion portion 16a of the rising portion 16 is divided. When the rising portion 16 is formed as described above, when a total width of widths of branch portions of the rising portion 16 does not change, or on the other hand, even when the cutting edge side of the rising portion 16 reduces more, the total width of an outside of the width-expansion portion 16a may have a size corresponding to the width-expansion portion.

Figure 9:
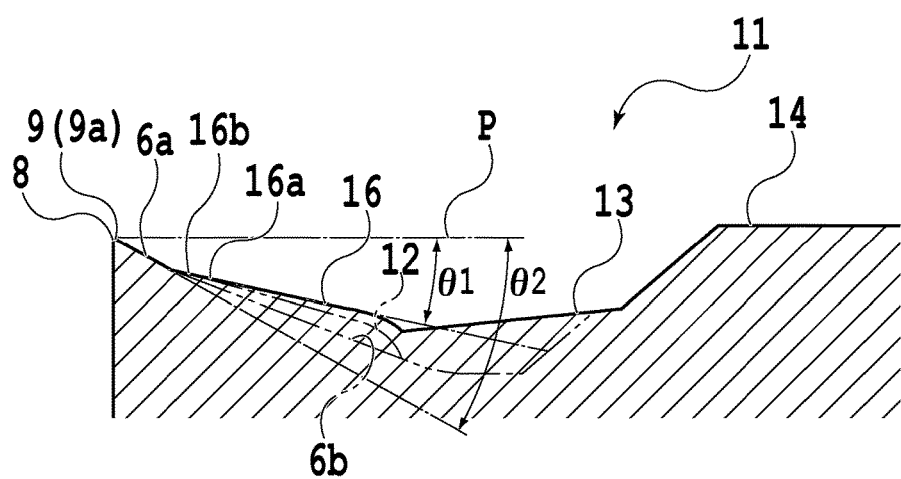
FIG. 9 is a schematic, cross-sectional view of a part of the cutting insert illustrated in FIG. 7 taken along a cross-sectional line IX-IX illustrated in FIG. 8B.

Herein, FIG. 9 is referred to. FIG. 9 is a schematic, cross-sectional view of a part of a cutting insert 101 along the line IX-IX illustrated in FIG. 8B. FIG. 9 illustrates a cross section taken along a line a-a illustrated in FIG. 8B with broken lines so that the cross section is conceptually overlapped while a dimension, an angle, and a ratio are adjusted. As illustrated in FIG. 9, the width-expansion portion 16a of the rising portion 16 inclines to gradually lower as a distance from the cutting edge 8 increases. In other words, the width-expansion portion 16a inclines to become gradually closer to the lower surface 3 that is the other end surface as a distance from the related cutting edge 8 on the upper surface 2 increases. According to the embodiment, a top portion (cutting edge side end portion) 16b of the width-expansion portion is also formed as the inclined plane. The inclined angle of the width-expansion portion 16a is set to be smaller than the rake angle of the rake surface 6. Of the rake surface 6, inside the cutting edge, the rising portion 16 rises from the second rake surface 6b to connect with the first rake surface 6a. Angle difference between an inclined angle θ1 of the width-expansion portion 16a and a rake angle θ2 of the first rake surface 6a is preferably within a range not less than 1 degree and not more than 30 degrees. If such an angle difference is adopted, a chip is securely separated away from the rake surface 6 by the rising portion 16, thereby reducing the crater wear on the rake surface 6. However exceptionally, the top surface of the top portion 16b of the width-expansion portion 16a may be formed as a plane parallel to the lower surface 3. In other words, the top surface of the top portion 16b may be a plane that does not incline (may extend along a virtual plane defined to be orthogonal to the axis 1b of the mounting hole 1a). The top portion 16b may include, in a part of the top portion 16b, a portion inclining to rise as a distance from the cutting edge 8 increases. However, it is preferable that the width-expansion portion 16a substantially, totally incline to gradually lower as a distance from the cutting edge 8 increases. In addition, the top surface of the top portion 16b of the width-expansion portion 16a is preferably a plane parallel to the lower surface 3. In other words, the inclined angle of the width-expansion portion 16a is preferably within a range not less than 0 degrees and not more than 20 degrees. In the cutting insert 1 according to the embodiment, the rake angle θ2 of the first rake surface 6a (i.e., inclined angle of the first rake surface 6a with respect to the virtual plane P defined to be orthogonal to the axis 1b of the mounting hole 1a) is set to approximately 12 degrees. The inclined angle θ1 with respect to the virtual plane P of the width-expansion portion 16a is set to approximately 10 degrees. In other words, the angle difference (=θ2−θ1) is set to approximately 2 degrees.

The rake surface 6 of the cutting insert 101 according to the embodiment has the double-step structure similarly to the above-described cutting insert 1. In other words, the rake surface 6 includes the land 15 that is the first rake surface 6a, and the second rake surface 6b. In the cutting insert 1 according to the embodiment, the above-described rake angle is defined as the inclined angle of the land 6a. However, the present invention is not limited to this configuration. The rising portion 16 may be disposed to connect to the second rake surface 6b toward the cutting edge. In this case, the rake angle becomes the rake angle of the second rake surface. The inclined angle of the width-expansion portion may be smaller than the rake angle of the second rake surface. In the case, the inclined angle of the width-expansion portion may be larger than the inclined angle of the land. Of course, the inclined angle of the land may be set to 0 degrees. Further, exceptionally, the inclined angle of the land may be set to the negative angle. When the inclined angle of the land is set to the negative angle, the rising portion 16 is preferably connected to the second rake surface.

The cutting insert 101 according to the embodiment further includes a breaker protruding portion 13 protruding toward the corner portion 5a in the chip breaker groove 11. In the cutting insert 101, on the above-described bisector of the corner portion 5a, the breaker protruding portion 13 is formed following the rising portion 16 from the side of the cutting edge 8. The breaker protruding portion 13 further provides a portion protruding toward the cutting edge side on the rising wall surface of the chip breaker groove 11. The breaker protruding portion 13 has a function for improving the chip control performance, when the depth of cut and the feed rate of the cutting conditions are small. In other words, the breaker protruding portion 13 has a function for expanding the cutting conditions that can be adopted. With synergetic effects by the ridge 12, the rising portion 16, and the breaker protruding portion 13, while the excellent chip control performance can be obtained, the crater wear of the rake surface 6 can be reduced, thereby realizing the excellent cutting insert 101 having the long life duration of the tool.

At the central portions of the upper surface 2 and the lower surface 3, the boss surface 14 functioning as the seat surface when the cutting insert is mounted in the cutting tool is formed. In other words, a limited width is given to the chip breaker groove 11. The breaker protruding portion 13 of the cutting insert 1 according to the embodiment is disposed to have a protruding portion 13a all around a circumference of the cutting insert. In other words, the breaker wall surface 11r of the chip breaker groove 11 connected to the boss surface 14 has the double-step structure all around the circumference of the cutting insert. However, the present invention is not limited to this configuration. Various types of known shapes can be adopted to each shape of the breaker protruding portion 13 and the breaker wall surface 11r.

The rising portion 16 of the cutting insert 101 according to the embodiment is connected to the breaker protruding portion 13 positioned on the bisector of the corner portion, in the similar manner to the rising portion 16, in a direction of being away from the cutting edge. Therefore, a chip that has passed the rising portion 16 can appropriately reach the breaker protruding portion 13. Then, the rising portion 16 intersects the breaker protruding portion 13. However, the rising portion 16 is not limited to this configuration. The breaker protruding portion 13 may not be provided. The rising portion 16 may be smoothly connected to the breaker protruding portion 13 or the breaker wall surface of the chip breaker groove 11.

Figure 11:
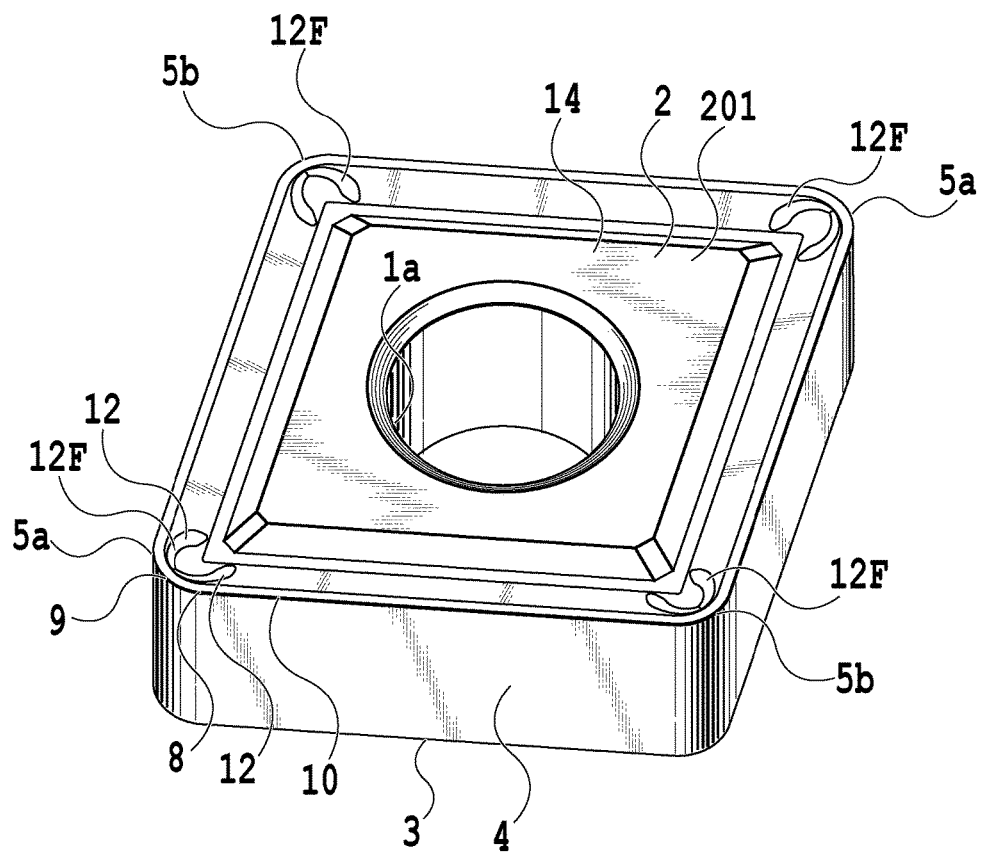
FIG. 11 is a perspective view of a cutting insert according to a third embodiment of the present invention.

Subsequently, with reference to FIG. 11, a cutting insert 201 according to a third embodiment of the present invention will be described. For simpler description, in descriptions below, the same member number will be given to the same components as those in the cutting insert 1 of the first embodiment, and the descriptions thereof will be omitted. Further, only differences between the cutting insert 201 according to the third embodiment of the present invention and the cutting insert 1 according to the first embodiment will be described below.

In the cutting insert 201 according to the embodiment, the two ridges 12 of each corner portion 5 in the above-described cutting insert 1 are formed to integrally continue to each other, and substantially form one ridge 12F. In other words, in each corner portion, the cutting insert 201 includes one ridge 12F that traverses the plane (corresponding to the above-described virtual plane IS) bisecting the cutting insert 201 at the corner portion 5 and continues in a mirror-symmetrical shape. As described above, the ridge 12 is not limited to be formed in even numbers for a mirror-symmetrical relationship.

The cutting insert of the invention is not limited to the embodiments described above. For example, the cutting insert can adopt various types of outline shapes of substantially polygonal plate shapes such as a substantially triangular plate shape and a substantially hexagonal plate shape.

Figure 12:
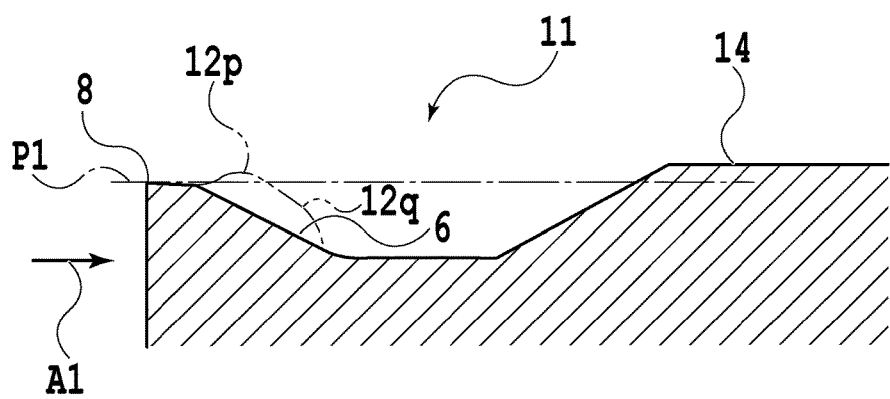
FIG. 12 is a schematic view for illustrating a modification example of the cutting insert illustrated in FIG. 1, and a schematic, cross-sectional view viewed at a position corresponding to a cross-sectional line V-V illustrated in FIG. 3.

Further, in the cutting inserts according to the first to third embodiments, the cutting edge 8 is formed to extend along the plane orthogonal to the axis 1b of the mounting hole 1a, and the ridge 12 is formed not to, in a side surface view of the cutting insert, protrude more outside in a direction of the axis 1b of the mounting hole 1a than the cutting edge 8. Therefore, in FIGS. 5 and 9, the broken lines of the ridge 12 are drawn at a lower position than the cutting edge 8. However, for example as illustrated in FIG. 12, the ridge 12 may include a visible portion 12p that protrudes outside from the cutting edge 8 and an invisible portion 12q that does not protrude outside and thus is hidden by the cutting edge 8 in a side surface view of the cutting insert (e.g., when viewed in a direction of an arrow A1). In FIG. 12, a line P1 is orthogonal to the axis 1b of the mounting hole 1a and also passes the cutting edge 8.

Figure 13:
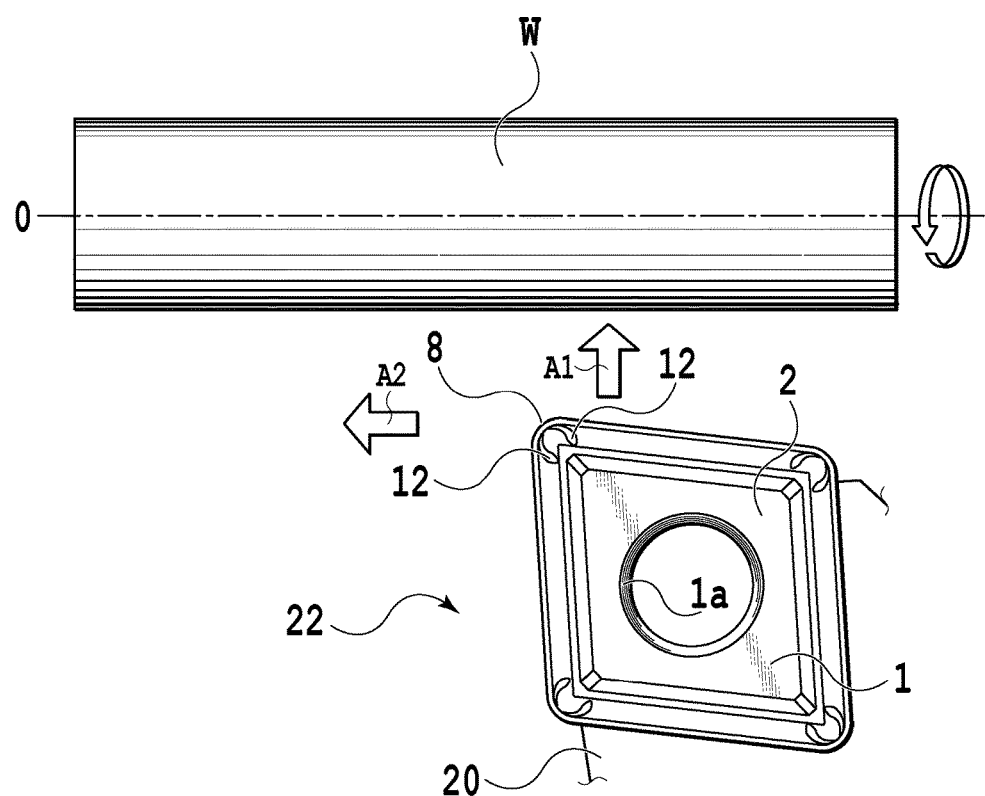
FIG. 13 is a view for illustrating an example of use of the cutting insert illustrated in FIG. 1.

Further, as a usage example of the cutting insert 1 according to the above-described first embodiment schematically illustrated in FIG. 13, all the cutting inserts according to the above-described first to third embodiments are lathe cutting inserts. Therefore, a cutting tool 22, on which the cutting insert 1 is detachably attached to a tip end of a holder (tool body) 20 using a screw (not shown) that is an attachment member, is forwarded with a predetermined cutting depth (arrow A1) in a feed direction (arrow A2) to a workpiece W to be rotated about an axis O. However, the present invention is not limited to such a cutting insert for a lathe but, for example, may be adopted to a milling cutting insert. More specifically, the present invention may be adopted to a cutting insert for an end mill including a ball end mill. Further, the present invention can be adopted to the cutting insert employing various types of mounting methods to a tool body of a cutting tool. For example, the present invention can also be adopted to a so-called tangential insert type of cutting insert. In some tangential insert types of the cutting inserts, the rake surface is defined to be the circumferential side surface, the flank is defined to be a part of the circumferential side surface or the end surface, and the cutting edge formed on the intersecting ridge line portion between the rake surface and the flank includes the cutting edge portion along the corner portion and the straight-line shaped cutting edge portion connecting to the cutting edge portion. The configuration described in the above-described embodiments can be similarly adopted to the rake surface in the tangential insert type of cutting insert having such a configuration. Or, the present invention can be adopted to the grooving cutting insert and the like.

The present invention has been described with a certain degree of concretion in the aforementioned embodiments, but the present invention is not limited to them. It should be understood that various modifications and changes are possible to the present invention without departing from the spirit and the scope of the present invention as set forth in the claims. In other words, the present invention includes all various modifications, applications and its equivalents covered by the concept of the present invention defined in the appended claims.

The invention claimed is:

1. A cutting insert comprising:
    at least one cutting edge formed on an intersecting ridge line portion between a rake surface and a flank, each cutting edge including a cutting edge portion extending along a corner portion and a straight-line shaped cutting edge portion connecting to the cutting edge portion of the corner portion; and
    at least two ridges formed at the corner portion to rise on the rake surface,
    wherein at least one of the at least two ridges extends from a first portion of the rake surface inside the cutting edge portion of the corner portion toward a second portion of the rake surface inside the straight-line shaped cutting edge portion, and
    wherein, in a cross-sectional view of the insert taken along a line passing through a central axis of the insert, the at least one of the at least two ridges has a first height at a first location that is a first distance from the corner portion; the at least one of the at least two ridges has a maximum height at a second location that is a second distance from the corner portion; the at least one of the at least two ridges has a third height at a third location that is a third distance from the corner portion; each of the first height, the maximum height and the third height is measured along a vertical line from a location starting on the rake surface; the first height is smaller than the maximum height; the third height is smaller than the maximum height; the first distance is smaller than the second distance; the second distance is smaller than the third distance; the height gradually increases from the first location to the second location; the height gradually decreases from the second location to the third location; and the at least one of the at least two ridges has a top edge with an arcuate shape.

2. The cutting insert according to claim 1, wherein the at least one of the at least two ridges is formed to be away from the cutting edge as becoming closer to the inside of the straight-line shaped cutting edge portion from the inside of the cutting edge portion of the corner portion.

3. The cutting insert according to claim 1, wherein the at least one of the at least two ridges extends in a curved shape to be convex toward a side of the cutting edge.

4. The cutting insert according to claim 1, wherein the at least one of the at least two ridges includes a portion in which an amount of rising from the rake surface is gradually increased as a distance from the cutting edge portion of the corner portion increases.

5. The cutting insert according to claim 1, further comprising:
    two opposite end surfaces, a first end surface of the two end surfaces having a substantially a polygonal shape, when the cutting insert is viewed from a side facing the first end surface, and
    a circumferential side surface formed between the two opposite end surfaces to connect with each other,
    wherein the cutting edge is formed on the intersecting ridge line portion between the rake surface of the first end surface and the flank of the circumferential side surface.

6. The cutting insert according to claim 5, wherein, when the cutting insert is viewed from the side facing the first end surface, the at least one of the at least two ridges is formed in a mirror-symmetrical relationship with respect to a plane which is defined so as to bisect the corner portion of the cutting insert.

7. The cutting insert according to claim 5, wherein, when the cutting insert is viewed from the side facing the first end surface, the at least one of the at least two ridges is formed to cross a plane which is defined so as to bisect the corner portion of the cutting insert, and has a mirror-symmetrical shape with respect to the plane.

8. The cutting insert according to claim 5, wherein, when the cutting insert is viewed from a side facing the circumferential side surface, the at least one of the at least two ridges includes a first portion protruding above the cutting edge and a second portion not protruding above the cutting edge.

9. The cutting insert according to claim 5,
wherein at least one rising portion is formed to rise on the rake surface of the first end surface; and
wherein the rising portion includes a width-expansion portion gradually expanding in a direction towards the cutting edge portion of the corner portion.

10. The cutting insert according to claim 9, wherein, when the cutting insert is viewed from the side facing the first end surface, the rising portion extends to be away from the cutting edge portion of the corner portion along a plane which is defined so as to bisect the corner portion of the cutting insert.

11. The cutting insert according to claim 5,
wherein, a plurality of cutting edges are formed on the intersecting ridge line portion between the first end surface and the circumferential side surface; and
wherein the first end surface is configured to have n-fold rotational symmetry about a first axis, n being a natural number of 2 or more.

12. The cutting insert according to claim 11, wherein a plurality of cutting edges are formed on the intersecting ridge line portion between the second end surface of the two end surfaces and the circumferential side surface, and the second end surface is configured to have 180-degree rotational symmetry with respect to the first end surface about a second axis defined to be orthogonal to the first axis.

13. A cutting insert comprising:
identical rhombus-shaped upper and lower end surfaces;
a circumferential side surface connecting the upper and lower surfaces;
a mounting hole connecting the upper and lower surfaces, the mounting hole having a central axis around which the insert has 180° rotational symmetry;
each of the upper and lower surfaces having a pair of diagonally opposite first corner portions provided with acute internal angle in a plan view, and a pair of diagonally opposite second corner portions provided with obtuse internal angles in the plan view;
each first corner portion having a first chip breaker groove comprising a rake surface, a first cutting edge being defined between the rake surface and a flank formed on the side surface, each first cutting edge comprising a first corner cutting edge and a pair of straight-line shaped cutting edges each extending from the first corner cutting edge;
each second corner portion having a second chip breaker groove comprising a rake surface, a second cutting edge being defined between the rake surface and a flank formed on the side surface, each second cutting edge comprising a second corner cutting edge and a pair of straight-line shaped cutting edges each extending from the second corner cutting edge;
wherein:
each corner portion has a pair of arc-shape ridges rising from the rake surface;
each arc-shaped ridge extends from a first portion of the rake surface inside the first corner cutting edge or the second corner cutting edge toward a second portion of the rake surface inside a straight-line shaped cutting edge portion defined by the pair of straight-line shaped cutting edges extending from the first corner cutting edge or the pair of straight-line shaped cutting edges extending from the second corner cutting edge;
each first corner portion has a bisector plane which contains the central axis;
at each first corner portion, the arc-shaped ridges begin at the portion of the rake surface inside the first corner cutting edge, and curve in opposite directions with concave portions of the arc-shaped ridges facing each other across the bisector plane;
in the plan view of the insert, at each first corner portion, the pair of arc-shaped ridges are mirror-symmetric with respect to the bisector plane; and
in a cross-sectional view of the insert taken along the bisector plane, the at least one ridge has a first height at a first location that is a first distance from the corner portion; the at least one ridge has a maximum height at a second location that is a second distance from the corner portion; the at least one ridge has a third height at a third location that is a third distance from the corner portion; each of the first height, the maximum height and the third height is measured along a vertical line from a location starting on the rake surface; the first height is smaller than the maximum height; the third height is smaller than the maximum height; the first distance is smaller than the second distance; the second distance is smaller than the third distance; the height gradually increases from the first location to the second location; the height gradually decreases from the second location to the third location; and the at least one ridge has a top edge with an arcuate shape.

14. The cutting insert according to claim 13, wherein:
at each first corner portion, an amount by which each ridge rises from the rake surface increases with increasing distance from the first corner cutting edge.

15. The cutting insert according to claim 13, wherein:
in the plan view of the insert's upper surface, at each first corner portion, the ridges cross the bisector plane to form a continuous U-shaped ridge.

16. The cutting insert according to claim 13, wherein:
in the cross-sectional view of the insert taken along the bisector plane, the ridge includes a first portion protruding above the first cutting edge and a second portion not protruding above the first cutting edge.

17. The cutting insert according to claim 13, further comprising:
in the cross-sectional view of the insert taken along the bisector plane, a rising portion extends on the rake surface along the bisector plane; from the first corner portion towards the center axis.

18. The cutting insert according to claim 13, further comprising:
in the plan view of the insert's upper surface, at each first corner portion, the rising portion includes a width-expansion portion gradually expanding in a direction towards the first corner cutting edge.

19. The cutting insert according to claim 13, wherein:
at each first corner portion, an amount by which each ridge rises from the rake surface increases with increasing distance from the first corner cutting edge;
in the cross-sectional view of the insert taken along the bisector plane, a rising portion extends on the rake surface along the bisector plane, from the first corner portion towards the center axis; and
in the plan view of the insert's upper surface, at each first corner portion, the rising portion includes a width-expansion portion gradually expanding in a direction towards the first corner cutting edge.

20. The cutting insert according to claim 19, wherein:
in the plan view of the insert's upper surface, at each first corner portion, the ridges cross the bisector plane to form a continuous U-shaped ridge; and
in the cross-sectional view of the insert taken along the bisector plane, the ridge includes a first portion protruding above the first cutting edge and a second portion not protruding above the first cutting edge.

* * * * *